United States Patent [19]

Breault

[11] Patent Number: 4,783,163
[45] Date of Patent: Nov. 8, 1988

[54] EYEGLASS NOSE PAD SYSTEM

[75] Inventor: Arnold R. Breault, Derby, Conn.

[73] Assignee: The Spectacle, Inc., Derby, Conn.

[21] Appl. No.: 839,110

[22] Filed: Mar. 13, 1986

[51] Int. Cl.⁴ .............................................. G02C 5/12
[52] U.S. Cl. .................................... 351/136; 351/138
[58] Field of Search ................ 351/136, 137, 138, 80, 351/88

[56] References Cited

U.S. PATENT DOCUMENTS

| | | |
|---|---|---|
| 2,392,418 | 1/1946 | Splaine . |
| 2,677,988 | 5/1954 | Belgard . |
| 3,060,803 | 10/1962 | McCulloch et al. . |
| 4,142,784 | 3/1979 | Bononi . |
| 4,331,393 | 5/1982 | Bradley, Jr. . |

FOREIGN PATENT DOCUMENTS

| | | | |
|---|---|---|---|
| 757047 | 5/1957 | Fed. Rep. of Germany . | |
| 2049668 | 4/1972 | Fed. Rep. of Germany . | |
| 2613151 | 10/1977 | Fed. Rep. of Germany . | |
| 287697 | 3/1928 | United Kingdom | 351/138 |
| 2102150 | 1/1983 | United Kingdom | 351/138 |

Primary Examiner—Rodney B. Bovernick
Assistant Examiner—P. M. Dzierzynski
Attorney, Agent, or Firm—Pennie & Edmonds

[57] ABSTRACT

Eyeglass frame and nose pad assembly in which the pad comprises a resiliently deformable unitary pad element including a plate portion for engaging the nose pad area of a given eyeglass frame rim, an intermediate base extending from the plate portion for insertion into a throughbore in the rim nose pad area which throughbore opens into the lens groove of the rim, and an end extension linear retainer extending from the base and defining a shoulder transition at the point of connection between the base and retainer, the retainer being arranged for insertion through the throughbore for location linearly in the lens groove and for deformable engagement therein with the lens periphery upon insertion of the lens in its groove, thereby lockingly mounting the element on the given rim, preferably with the element having a pair of spaced apart bases and retainers and the given frame rim having a corresponding pair of throughbores.

18 Claims, 3 Drawing Sheets

EYEGLASS NOSE PAD SYSTEM

FIELD AND BACKGROUND OF THE INVENTION

The present invention relates to an eyeglass nose pad system, and more particularly to a nose pad for an eyeglass frame, an eyeglass frame usable with such a nose pad, and an eyeglass frame and nose pad assembly.

Many types of nose pad constructions for eyeglasses are known, including those which are removable, adjustable or exchangeable with other nose pads, especially for achieving a desired fit of a given pair of eyeglasses for the particular wearer. These known constructions are for the most part complicated in construction, design and adjustment, expensive to produce, and/or often require extraneous parts or materials such as adjustment tools, the use of adhesive cement, and the like. The arguable advantage of precise adjustment of nose pads on a pair of eyeglasses for a particular individual is generally completely offset by the above disadvantages, whereas those non-adjustable nose pads of simple design and low cost such as pressure sensitive adhesive add on nose pads are subject to premature loosening, slipping and disassembly.

Splaine (U.S. Pat. No. 2,392,418) shows an eyeglass frame in which holes are drilled therethrough from the front side to the rear side of the non-metal lens frame rim and nose bridge element to mount the separate metal temple element thereto by a plate and rivet connection system. The lenses are snap fitted into the usual internal grooves of the non-metal frame rims upon heating the rims sufficiently to expand them and render them pliable to pressure insertion of the lenses in the usual manner. The nose pads are provided as rigid extensions integral with the frame rims, and the plate and rivet connection system is remote from the lenses and internal lens grooves of the frame rims.

Belgard (U.S. Pat. No. 2,677,988) shows complex eyeglass nose pads formed of a projecting stud stationarily externally fixed to the frame rim by cement or fusing means or as an integral extension on the rim, plus a separate socket recess containing pad partially mounted via the recess on the stud and held in place by bending a pair of external tabs on the pad inwardly against the adjacent exposed portion of the stud. Different pads contain their recesses in different positions relative to the profile of the pads so that a given pad may be selected as more appropriate for a particular wearer's nose. One pad may be exchanged for another by loosening the tabs to remove a given pad from the projecting stud and replacing it with one having a recess in a different position relative to the pad profile.

Bononi (U.S. Pat. No. 4,142,784 and its counterpart German patent document Off. No. 2,613,151) shows a blind shallow slot recess in the nose pad area of the eyeglass frame rim in which a separate generally L-shaped nose pad is inserted and firmly bonded in place. The blind slot recess is remote from and does not communicate with the lens holding groove of the rim.

Kahne (German Pat. No. 757,047) shows a similar blind shallow slot recess in the nose pad area of the eyeglass frame rim in which a separate projection containing nose pad is inserted and presumably firmly bonded in place.

Bradley, Jr. (U.S. Pat. No. 4,331,393) shows a separate removable nosepiece containing both pads integrally therein which is mounted as a unit between the eyeglass frame rims and attached to each by a complex system of screws and shims acting as lock washers. The nose piece is mounted by such screws on projections integral with the frame rims and disposed in the normal areas of the usual integral rigid nose pads, and thus the screws and their holes are remote from the lenses and internal lens grooves of the frame rims.

Schlierf (German patent document Off. No. 2,049,668) concerns a nose pad for an eyeglass frame arrangement in which a blind screw hole is provided in the nose pad for fixing it to the pad arm (not shown), and thus allowing pads to be changed to suit the wearer.

McCulloch (U.S. Pat. No. 3,060,803) shows a notch like recess in the nose pad area of the eyeglass frame rim and a separate split ring type internal groove containing lens holder having a rigid nose pad stud which is insertable into the notch like recess of the frame rim, after which a screw near the temple element hinge may be tightened to clamp the lens holder in the frame rim with the rigid nose pad in the usual position.

These known constructions which are exemplary of the prior art do not provide simple, low cost constructions of nose pads of comfortable usage and which are at the same time easily and rapidly lockingly mounted to the frame rims of eyeglasses.

SUMMARY OF THE INVENTION

It is among the objects and advantages of the present invention to overcome the drawbacks and deficiences of the prior art, and to provide an eyeglass nose pad system of simple and low cost construction, comfortable and long wearing in use without slippage or premature separation or dislodgement of the nose pad from the eyeglass frame rim, yet readily removably replaceable by a different nose pad, using a mounting system which is not visible and thus which avoids any unsightly appearance.

It is among the additional objects and advantages of the present invention to provide a nose pad system of the foregoing type, which may be assembled or disassembled without the use of cement, extra parts or tools, and in easy and rapid manner in accordance with the usual procedure for mounting and removing a given lens from the pair of eyeglasses.

It is among the further objects and advantages of the present invention to provide a nose pad system of the stated type, which is applicable to existing eyeglass frames with simple modification, and which preferably contemplates a symmetrical nose pad element of a common size and shape for use as both the left and right side nose pad interchangeably on all types of eyeglass frames having lens holding groove containing frame rims.

BRIEF DESCRIPTION OF THE DRAWINGS

Other and further objects and advantages of the present invention will become apparent from a study of the within specification and accompanying drawings, in which.

DETAILED DESCRIPTION OF THE PREFERRED EMBODIMENTS

The present invention firstly concerns an eyeglass frame nose pad comprising a resiliently deformable unitary pad element including a plate portion, and a mounting portion comprising intermediate base means and end extension linear retaining means.

The plate portion has an outer side for engaging the nose of the wearer and an inner side adapted for engaging the corresponding nose pad area of an eyeglass frame rim.

The intermediate base means is connected to and extends outwardly from the inner side of the plate portion in a direction away from the outer side of the plate portion and is sized and shaped for insertion into corresponding throughbore means in the nose pad area of the eyeglass frame rim which throughbore means open into the corresponding lens retaining internal groove of the eyeglass frame rim.

The end extension linear retaining means is connected to and extends outwardly from the intermediate base means in such direction away from the plate portion outer side and defines a shoulder transition at the corresponding point of connection with the base means.

Significantly, the retaining means is sized and shaped for insertion through the throughbore means for location in and disposition linearly along the internal lens holding groove of the eyeglass frame rim and is adapted for deformable engagement in the groove with the adjacent periphery of the corresponding eyeglass lens upon insertion of such lens into such groove for thereby lockingly mounting the element on the corresponding frame rim.

The element is desirably comprised of pliable and flexible, stretchable and compressible, soft cushioning material, such as suitable plastic or rubber material.

Favorably, the base means has a predetermined cross sectional thickness and the retaining means has a smaller cross sectional thickness than that of the base means, and the shoulder transition defines an inward crosswise step from the base means to the retaining means.

Optionally, an outwardly directed stop means is disposed at the shoulder transition, the stop means being sized and shaped to exceed slightly thereat the corresponding internal diameter of the throughbore means in the eyeglass frame rim sufficiently to engage the adjacent margin of the end of the throughbore means located within the internal groove of the frame rim for acting as a self locking stop thereat for enhanced prevention of separation of the element from the frame rim.

More specifically, the base means includes a pair of spaced apart intermediate bases correspondingly connected to and extending outwardly from the inner side of the plate portion and each such base is sized and shaped for insertion into a corresponding throughbore in the eyeglass frame rim. In turn, the retaining means includes a pair of spaced apart end extension linear retainers correspondingly connected to and extending outwardly from the pair of bases and define a pair of pair of shoulder transitions at the corresponding points of connection with the bases.

The retainers are each sized and shaped for location in and disposition linearly along the internal groove of the frame rim and are adapted for corresponding deformable engagement therein with the adjacent periphery of the eyeglass lens upon insertion of such lens into such groove.

Each such base favorably has such a predetermined cross sectional thickness and each such retainer has a smaller such thickness than that of the corresponding base, and each such shoulder transition defines such an inward crosswise step from the corresponding base to the corresponding retainer.

Also, optionally an outwardly directed stop is disposed at each such shoulder transition, each such stop being sized and shaped to exceed slightly thereat the internal diameter of the corresponding throughbore in the eyeglass frame rim sufficiently to engage the adjacent margin of the end of such throughbore located within the internal groove of the frame rim for acting as such a self locking stop thereat.

The present invention also concerns an eyeglass frame and nose pad assembly comprising a pair of opposed eyeglass lens frame rims and a nose bridge disposed therebetween. Each rim has an external nose pad area adjacent the nose bridge for accommodating a nose pad, an internal groove operatively retaining an eyeglass lens inserted therein, and significantly throughbore means defined in the rim and extending from the nose pad area to the groove.

In this regard, mounted on each rim is a corresponding resiliently deformable unitary pad element including a plate portion having an outer side for engaging the nose of the wearer and an inner side engaging the nose pad area of the rim, intermediate base means connected to and extending outwardly from the inner side of the plate portion in a direction away from the outer side of the plate portion and inserted into the throughbore means in the rim, and end extension linear retaining means connected to and extending outwardly from the intermediate base means in such direction and defining a shoulder transition at the corresponding point of connection therebetween.

Significantly, the retaining means is located in and disposed linearly along the groove of the rim and deformably engaged in the groove with the adjacent periphery of the eyeglass lens inserted in the groove and thereby lockingly mounting the element on the corresponding rim.

More specifically, the construction of the element, and in particular the base means and retaining means thickness dimensions and thereby defined inward crosswise step, the optional stop means thereat, and the pairs of bases, retainers, shoulder transitions, and optional stops, and the pair of corresponding throughbores in the rim, correspond to the earlier described arrangement of these parts.

Whereas the resiliently deformable unitary pad element is desirably composed of pliable and flexible, stretchable and compressible, soft cushioning material such as suitable plastic or rubber material, the frame rims are desirably composed of plastic or metal.

The present invention collaterally concerns an eyeglass frame comprising a pair of opposed eyeglass lens frame rims and a nose bridge disposed therebetween, each rim having an external nose pad area adjacent the nose bridge for accommodating a nose pad, an internal groove for operatively retaining an eyeglass lens therein, and significantly throughbore means defined in the rim and extending from the nose pad area to the groove.

The throughbore means is sized and shaped to receive insertingly thereat a resiliently deformable mounting portion of a resiliently deformable unitary nose pad element and which mounting portion includes an end portion adapted to be disposed in the groove in deformable engagement therein with the adjacent periphery of the corresponding eyeglass lens upon insertion of such lens into such groove for thereby mounting the element on the corresponding rim.

More particularly, the throughbore means desirably includes a pair of spaced apart throughbores extending from the nose pad area to the groove.

Figure 1:
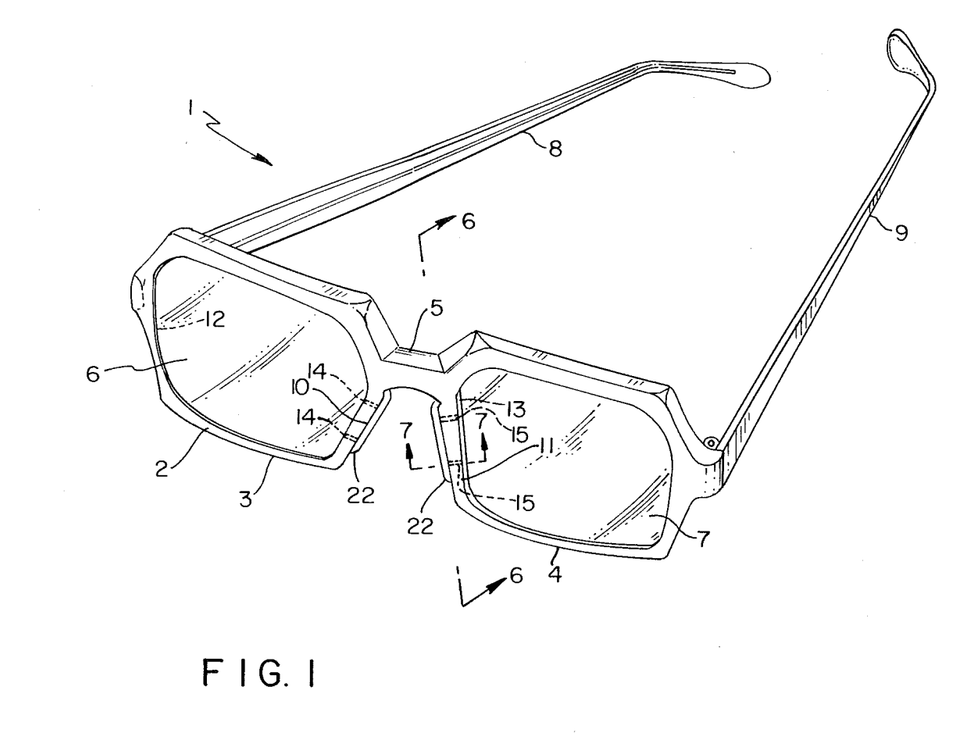
FIG. 1 is a schematic perspective view of a pair of eyeglasses containing the nose pad system according to an embodiment of the present invention.
Figure 2:
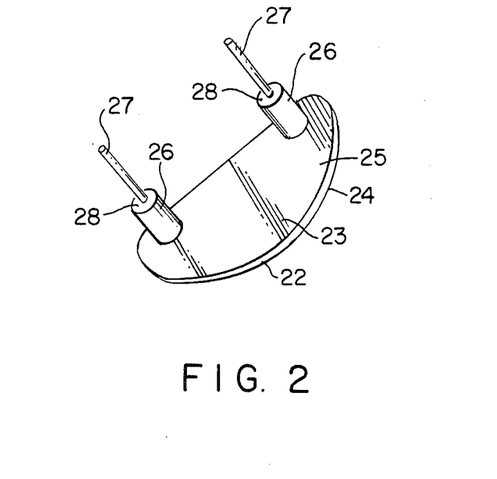
FIG. 2 is a schematic perspective view of an embodiment of a nose pad element according to the present invention.
Figure 3:
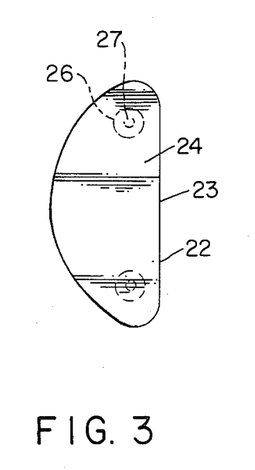
FIGS. 3 and 4 and schematic outer and inner side views, respectively, of the element of FIG. 2.
Figure 4:
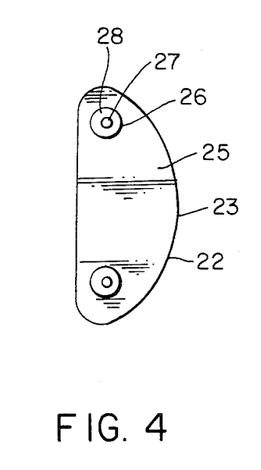

Referring to the drawing, and initially to FIG. 1, an eyeglass frame and nose pad assembly 1 is shown comprising an eyeglass frame 2 having a pair of opposed left and right eyeglass lens frame rims 3,4 interconnected by a nose bridge 5 disposed therebetween and containing the eyeglass lenses 6,7 in the usual manner, plus the temple elements 8,9 hingedly connected to the distal lateral sides of the rims 3,4, respectively.

Figure 5:
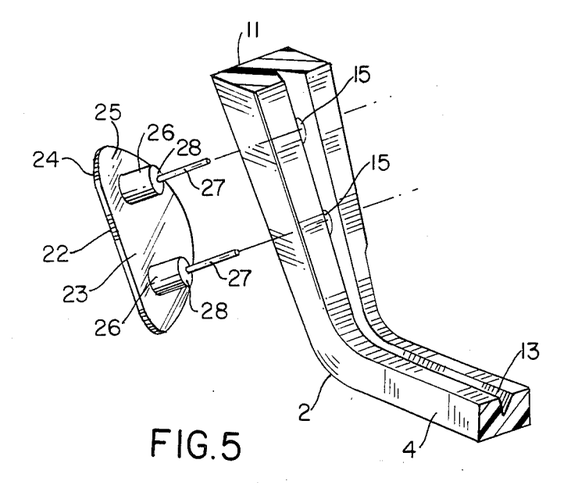
FIG. 5 is a schematic explosive view of the element of FIG. 2, illustrating its manner of mounting to a frame rim of the pair of eyeglasses shown in FIG. 1.
Figure 6:
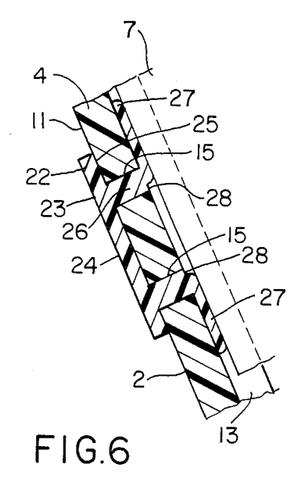
FIGS. 6 and 7 are schematic exaggerated longitudinal and transverse sectional views taken along the lines 6—6 and 7—7, respectively, of FIG. 1, and showing the locking engagement of the inner end portions of the mounting portions of the nose pad element, lying in the internal lens groove of frame rim, with the corresponding periphery of the lens upon insertion of the lens in the groove.
Figure 7:
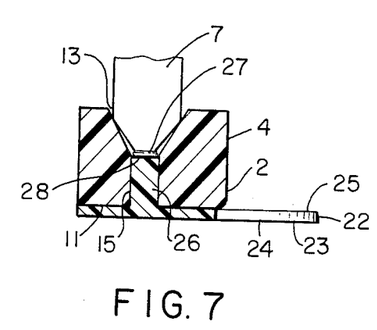

The proximate lateral sides of the rims 3,4 are provided with medial external nose pad areas 10, 11 adjacent the nose bridge 5, and each rim is provided with the usual lens retaining internal groove 12, 13, groove 13 in rim 4 being shown in FIGS. 5–7. The grooves 12, 13 may be favorably provided as V-grooves, and suitably operatively retain the corresponding lenses 6,7 therein, such as upon pressure insertion to provide them in press fit manner in the frame 2.

Thus, where the frame 2 is composed of plastic, such as Zylonite or the like, it may be suitably heated to expand the rims 3,4 and/or render them more flexible, whereupon the lenses may be snap fit into the grooves 12,13. Upon cooling, the rims contract and/or are rendered less flexible, so that retention of the lenses in the grooves is assured.

According to the present invention, a pair of spaced apart throughbores 14,14 is provided in frame rim 3 which extend from nose pad area 10 to the groove 12, and a like pair of spaced apart throughbores 15,15 is provided in frame rim 4 which extend from nose pad area 11 to the groove 13, as shown in phantom in FIG. 1. The disposition of the throughbores 15,15 in frame rim 4 is more clearly shown in FIGS. 5–7.

These throughbores 14,14 and 15,15 are readily provided by the manufacturer or at the end point of use, e.g. by merely drilling the rims 3 and 4 to so provide these throughbores as round holes.

Mounted on each rim 3,4 at the nose pad area 10,11 thereof is a corresponding eyeglass frame nose pad according to the present invention, comprising a resiliently deformable unitary pad element 22. These elements 22 are desirably duplicates of each other and preferably symmetrical in terms of their size and shape (see FIGS. 2–5).

Element 22 includes a plate portion 23 having an outer side 24 for engaging the nose of the wearer and an inner side 25 for engaging the corresponding nose pad area 10 or 11. Plate portion 23 is desirably of generally thin, flat and even planar configuration and of course is suitably resiliently deformable for comfortable cushioning of the eyeglass assembly 1 on the nose of the wearer.

Element 22 also includes a mounting portion having an end portion adapted to be disposed in the corresponding groove 12 or 13, and generally comprises intermediate base means such as the pair of spaced apart bases 26,26 and end extension linear retaining means such as the corresponding pair of retainers 27,27.

The bases 26,26 are connected to and extend outwardly from the inner side 25 of the plate portion 23 in a direction away from the outer side 24 of the plate portion 23 such as in a direction perpendicular to the plane of the plate portion 23. Bases 26,26 are sized and shaped, e.g. as round or cylindrical parts, for insertion into the throughbores 14,14 of rim 3 or the throughbores 15,15 of rim 4, as the case may be (see FIG. 5).

Since these throughbores open into the corresponding lens retaining grooves 12,13, the retainers 27,27, which are connected to and extend outwardly from the free ends of the bases 26,26 in the same direction away from the plate portion 23, freely enter the corresponding grooves 12,13. The retainers 27,27 define a shoulder transition 28,28 at the corresponding point of connection thereof with the bases 26,26.

The bases 26,26 are favorably provided of a predetermined cross sectional thickness corresponding generally to the internal diameter of the throughbores 14,14 and 15,15 for a play free and preferably snug fit or friction fit engagement with the throughbores. Since the retainers 27,27 must fit within and along the lens grooves 12,13, they are suitably of smaller cross sectional thickness than that of the bases 26,26, and thus the shoulder transitions 28,28 define an inward step from the bases 26,26 to the retainers 27,27 (see FIGS. 2 and 5).

The retainers 27,27 are desirably sized and shaped, e.g. also as round or cylindrical parts, for insertion through the corresponding throughbores 14,14 or 15,15 for location in and disposition linearly along the interal groove 12 or 13, as the case may be, and significantly for deformable engagement in the corresponding groove with the adjacent periphery of the lens 6 or 7 upon insertion of the lens in the groove, as above described, for thereby lockingly mounting the element 22 on the corresponding frame rim 3 or 4.

Figure 8:
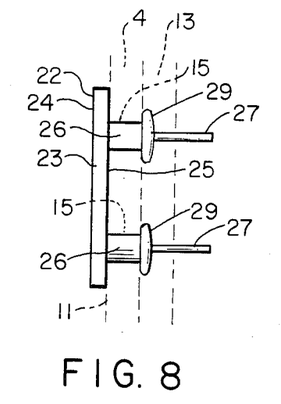
FIG. 8 is a schematic side view of a modified form of the nose pad element shown in FIGS. 2 to 7.

Optionally, as shown in FIG. 8, an outwardly directed stop 29,29, e.g. in the form of a flange such as a slightly bulbous flange, may be disposed at the shoulder transition, favorably sized and shaped to exceed slightly thereat the corresponding internal diameter of the throughbore 14,14 or 15,15, as the case may be, and sufficiently to engage the adjacent margin of the end of the throughbore which is located within the internal lens groove 12 or 13 for acting as a self locking stop thereat. This will enhance prevention of separation of element 22 from its rim 3 or 4.

Thus, conveniently the bases 26 are individually sized and shaped to conform to the interior confines of the intended throughbore into which each is to be inserted. Preferably, each base 26 is of such girth or cross sectional thickness or diameter as to engage snugly at least a part, if not all, of the surrounding surface of the associated throughbore for enhanced support and retention of the element 22 on the given rim 3 or 4.

In turn, each base 26 is also preferably of such length, between its connected end at the inner side 25 of plate portion 23 to its free end at the shoulder transition 28, that the latter s substantially in line with the adjacent margin of the throughbore end located in the given groove 12 or 13 (cf. FIGS. 5 and 6).

On the other hand, the retainers 27 are individually sized and shaped to pass readily and without hindrance through the intended throughbore into which each is to be inserted or threaded, and to fit within and be disposed linearly along the interior confines of the blind bottom of the associated internal lens groove for the desired deformation engagement thereof with the given inserted lens 6 or 7.

In this regard, it will appreciated that each retainer 27 is favorably located linearly along the corresponding lens groove blind bottom zone rather than crosswise thereof, as the latter disposition will cause the periphery or edge of the given lens, upon insertion, to engage the linear extent of the retainer in crosswise manner rather than in common coextensive linear abutment relation along the groove, and this may lead to improper seating of the lens in the groove.

For this reason, preferably each retainer 27 is of such girth or cross sectional thickness or diameter as to occupy in squeezed or compressively deformed condition the reduced composite cross sectional area confined between the adjacent side and blind bottom portions of the given groove 12 or 13 and the adjacent periphery of the given inserted lens 6 or 7 thereat, which reduced composite cross sectional area is usually smaller than that of the corresponding throughbore.

In this way, the retainer 27 will conveniently engage under suitable compression at least a substantial part, if not all, of the surrounding surfaces of the associated lens groove and lens thereat and therealong, and be locked in position, thereby allowing no slippage at all, and thus positively preventing play or loosening of the element 22 relative to the corresponding rim 3 or 4.

In turn, each retainer 27 is also preferably of such length, between its connected end at the shoulder transition 28 and its free end, that it exceeds the length of the associated throughbore sufficiently to permit the retainer 27 to be inserted or threaded through the throughbore until the shoulder transition 28 abuts the adjacent margin of the throughbore end located at the nose pad area 10 or 11, as the case may be, as where the corresponding base 26 is sized for snug fit relation with the throughbore, while at the same time the free end of the retainer 27 freely protrudes from the opposite end of the throughbore, which is located at the lens groove 12 or 13, a distance adequate for grasping, e.g. manually, such protruding free end.

Hence, upon pulling the protruding free end of the retainer 27, due to the resiliently deformable and unitary, i.e. integral and preferably one piece, nature of the material of which the element 22 is composed, the mounting portion thereof which is comprised of the base 26 and retainer 27 will be distended or stretched along its composite length, thereby inherently reducing the girth or circumference of the base 26 relative to the counterpart girth or circumference of the corresponding throughbore sufficiently to permit the base 26 to be pulled completely into the throughbore until the inner side 25 of the plate portion 23 abuts the rim 3 or 4 at its nose pad area 10 or 11, and favorably in turn the shoulder transition 28 is in alignment with the margin of the throughbore end at the associated groove 12 or 13 (cf. FIGS. 5 and 6).

It will be appreciated that due to the deformable nature of the material of which the element 22 is composed, mere pushing against the outer side 24 will cause the corresponding base 26 at the shoulder transition 28 to distort at the entrance end of the throughbore and act against the surface of the nose pad area thereat and thereby spread so as to prevent insertion of the base 26 into the throughbore. Instead, the base 26 is pulled into the throughbore under a stretching retainer 27 must be provided to enable an exposed free end to exist as the pulling point.

Thus, the length of the retainer 27 is of significance in assuring that it will readily be inserted through the throughbore, and once inserted that its free end will protrude from the corresponding lens groove sufficiently to permit the pulling of the remainder of the element 22 in place on the rim 3 or 4. That length is of less significance as regards the anchoring or locking of the element 22 in place, as this function is fulfilled more efficiently and more completely by the girth or circumference of the retainer 27 in relation to the counterpart confining composite girth or circumference represented by the adjacent side and blind bottom portions of the given groove 12 or 13 and the adjacent periphery of the given inserted lens 6 or 7 thereat (cf. FIG. 7).

In view of the above, the element 22 is desirably composed of resiliently deformable material such as plastic or rubber which is also pliable and flexible as well as stretchable and compressible, in addition to being soft and cushioning in nature. These characteristics enable the base 26 and retainer 27 to be pulled and distorted without tearing or rupture, whereby to achieve temporary mounting of the element 22 on the rim 3 or 4 in the described manner, and upon placing the periphery of the lens 6 or 7 at the rim 3 or 4 downwardly retainers 27,27 so as to bend the retainers 27,27, preferably outwardly away from each other, or in the same bending direction, so that they lie linearly along the groove 12 or 13, the given lens may then be snap fitted into such groove, whereby to squeeze the retainers 27,27 against the adjacent confines of the groove and achieve permanent mounting of the element 22 in place.

Even in the case where the retainers 27,27 are bended inwardly toward each other along the given lens groove, and their lengths are such that they partially overlap at their free ends in the groove, due to their pliable, stretchable and compressible nature, this overlap will not interfere with the proper seating of the lens in the groove. Instead, the locally enlarged composite girth or circumference represented by such partial overlap of the free ends of the retainers 27,27 will distribute itself throughout the available space within the local counterpart confining composite girth or circumference threat represented by the adjacent surfaces of the groove and lens periphery.

Of course, desirably the resiliently deformable material of the element 22 should possess sufficient tensile strength to permit pulling or stretching of the base 26 and retainer 27 for temporary mounting purposes as earlier described, without any fear of tearing or rupture, and should also possess sufficient heat resistance to withstand the heating temperature to which the frame 2 is subjected in performing the conventional heat assisted snap-in type lens mounting procedure as discussed above, without destroying the structural integrity of the element 22.

Understandably, due to the very purpose of providing nose pads, the resilient deformable material of the element 22 will necessarily be a soft cushioning material, and to minimize slippage of the eyeglass frame 2 on the wearer, the element 22 is preferably also composed of such a material possessing friction enhancing properties, or alternatively the outer side 24 thereof is provided with a friction imparting texture or coating in the conventional manner serving the same friction enhancing purpose.

As to the modification of FIG. 8 in which the shoulder transition 28 is provided with a stop 29 such as a circular flange extending crosswise of the longitudinal axis of the base 26 and retainer 27, this is of advantage in achieving temporary mounting of the element 22 on the given rim 3 or 4, especially where the girth or circumference of the base 26 is sufficiently smaller than the counterpart girth or diameter of the intended throughbore 14 or 15 to otherwise permit loose releasable disposition of the element 22 on the rim 3 or 4 to occur. In such case, the presence of the stop 29 prevents dislocation of the temporarily mounted element 22 during manipulation of the frame 2, in inserting the corresponding lens 6 or 7 in the groove 12 or 13. The relatively thin thickness of the stop 29, even where it is in the form of a bulbous flange, is readily accommodated in the confines of the groove upon insertion of the lens, in the same manner as the retainer 27 (cf. FIG. 7)., considering the deformable nature of the element 22.

It will be appreciated that due to the wide tolerances and variations in dimensions of eyeglass frame rims and their grooves and of the depths and shapes of such grooves, it would be impractical to provide a corresponding wide inventory of different size base 26 and retainer 27 containing elements 22. Rather it is more practical and convenient as well as less costly to provide a selective common size element 22 for mounting on all eyeglass frames 2, and especially a symmetrical element 22.

To this end, while a common size throughbore may be provided in all frames 2 by the manufacturer, or may be drilled in each frame 2 at the point of end use, which size is designed to be accommodated by a correspondingly sized girth or circumference provided for the base 26 of a common size element 22, preferably with the pair of bases 26, 26 being of uniform size as to girth or circumference as well as to length, and favorably also with the corresponding pair of retainers 27, 27 being of uniform size as to girth or circumference as well as to length, whereby especially to provide each element 22 as a symmetrical structure, allowing use as a nose pad on either frame rim 3 or 4, as the case may be, nevertheless, since this common or uniform feature may not be applicable to all frames 2, the length of the base 26 is desirably selected to conform substantially to that type of available frame 2 having the smallest thickness dimension as measured in the direction from the nose pad area 10 or 11 to the blind bottom of the lens groove 12 or 13.

In this way, the shoulder transition 28 will thereby be more or less aligned with the bottom portion of the lens groove 12 or 13 upon insertion of the base 26 and retainer 27 in the associated throughbore.

On the other hand, in the case of thicker dimensioned rim type frames 2, upon insertion of the base 26 in the associated throughbore the shoulder transition will be aligned with the interior of the throughbore at a point inwardly of the lens groove, yet because of the nature of the material of which the element 22 is composed and the sufficiency of the length of the retainer 27, the exposed portion of the retainer 27 may be bended along the lens groove in the above described manner and upon insertion of the lens will be adequately anchored or locked in place, thereby also locking the element 22 in place on the rim 3 or 4.

This is because it is primarily the girth or circumference, rather than the length, of the retainer 27 which is responsible for the locking of the element 22 in place on the rim 3 or 4, as discussed above.

In the case of the stop 29 containing embodiment of FIG. 8, due to the resiliently deformable nature of the material of which the element 22 is composed, in the event of the use of such a thicker dimensioned rim type frame 2 such that upon insertion of the element 22 mounting portion the stop 29 is aligned with the interior of the associated throughbore at a point inwardly of the lens groove, this condition will still enable the element 22 to be maintained in the desired temporary mounting position.

This is because the inwardly compressed stop will act outwardly against the confining surface of the throughbore to prevent dislocation of the element 22 during the lens mounting operation, especially where the girth or circumference of the base 26 is less than the counterpart girth or circumference of the throughbore, whereas the retainer 27 because of its pronounced length will readily extend along the lens groove as the lens engages it to bend it into the groove during such lens mounting operation.

Of course, to some extent the dimensions of the base 26 and of the rim thickness and lens groove thickness, although unequal or unmatched may readily accommodate one another in the case where the free end of the inserted base 26 at the shoulder transition 28 protrudes into the lens groove 12 or 13, since the bottom portions of the groove, especially in the case of a V-groove, provide a sufficient space for receiving a slightly protruding free end of the base 26 without interfering with the proper seating of the lens in its groove and the linear disposition of the retainer 27 therealong.

This is because of the relatively small girth or circumference of the retainer 27 and especially of the resiliently deformable nature of the material of which the element 22 is composed.

It will be appreciated that both the left and right sides of the frame 2 and all of their related parts generally constitute like members on each side, such that rims 3 and 4, lenses 6 and 7, nose pad areas 10 and 11, grooves 12 and 13, and throughbores 14,14 and 15,15 comprise left and right mirror image constructional arrangements. Hence, the arrangement of the parts shown in FIGS. 5-8 relative to rim 4 is the mirror image of the arrangement of the parts (not shown) relative to rim 3.

Since element 22 is a desirably symmetrical construction, its disposition will be identical on both rim 3 and rim 4, but in mirror image relation in line with the foregoing.

Although the system of the present invention has been shown and described above in relation to an eyeglass frame of the non-metal or plastic type in which heat and/or flexibility of the rims is utilized for mounting the lenses in their grooves, and thus for simultaneously lockingly mounting the corresponding element 22,22 on the rims 3 and 4, the same applies analogously to an eyeglass frame of the metal type, as the artisan will appreciate.

In this regard, in accordance with conventional technique, in the case of a metal eyeglass frame, split ring type metal rims or partially open metal rims are provided in each case having an associated internal lens mounting groove and mechanical adjustable locking means such as screw means for locking the lens in the corresponding groove.

Hence, the same type throughbores are drilled into the metal rims as earlier described for the non-metal or plastic rims 3 and 4, and upon temporarily mounting the particular element 22 in place, the lens is inserted in the same manner so as to bend the retainers 27, 27 along the groove, whereupon the lens is locked in the groove by such mechanical locking means.

Also, while the element 22 has been shown and described as having a pair of mounting portions each comprising a base 26 and a retainer 27, of generally round or cylindrical shape, it is possible although less convenient and/or more costly to provide each element 22 with only one base 26 and retainer 27 and/or of oval or polygonal bar type shape.

However, where only one such base and retainer is used, the plate portion 23 due to its resiliently deformable nature will not seat adequately against the nose pad area 10 or 11 and may tend to slip or flap upwardly out of its desired position, and where the single base 26 is of round or cylindrical shape, it may cause rotation of the element 22 relative to the rim 3 or 4 even where there is otherwise a snug relation between the base 26 and the associated throughbore 14 or 15.

On the other hand, where the base 26 is provided with an oval or polygonial bar shape, either a more expensive process must be utilized to provide a corresponding counterpart shape for the throughbore to receive the base, or the throughbore must be provided with a relatively large round shape whereupon wobble or play will be introduced into the connection, if not rotation of the element 22 as well.

The above problems may be avoided to some extent where the single base 26 is provided as a more or less flattened oval or rectangular or plate shaped elongate part, but here also the throughbore therefor must be provided as a correspondingly shaped elongate through slot, which is not only difficult to achieve in the confined space of the rim but which may tend to weaken unduly the basic structural integrity of the rim.

Hence, it is preferred that the mounting portion of the element 22 comprises base means, retainer means and shoulder transition means in the form of a pair of bases, retainers and shoulder transitions as contemplated in FIGS. 2-7, and optionally containing a corresponding pair of stops as contemplated in FIG. 8, or at least one such stop to keep the element 22 in mounted position on the rim prior to lens insertion in view of the temporary nature of such stop aided mounting arrangement which is the primary purpose of the stop.

Nevertheless, due to the resiliently deformable characteristic of the material of which the element 22 is composed, even when the pair of stops 29, 29 is locked in place by the inserted lens, they serve to enhance prevention of separation or dislodgement of the element 22 in addition to the primary prevention of such separation or dislodgement provided by the retainers 27, 27 (cf. FIG. 8).

Obviously, just as the lenses may be individually replaced, a given element 22 may be likewise replaced, by following the reverse procedure of first removing the lens, thereby unlocking the element 22, and then merely pulling the element 22 away from the rim. Since the elements 22 are designed and intended for permanent or long duration use, they should last for the practical lifetime of the given lenses associated therewith and may be replaced when the lenses are replaced, all without the need to use extraneous materials such as bonding cement, special tools or the like, and by way of simple and rapid assembly and disassembly as the lenses are inserted or removed from the rims.

As desired, the plate portion 23 may be provided of any color, shape and texture, pertinent to eyeglass usage, and may be perforate or imperforate, yet due to the hidden disposition of the bases 26 and retainers 27, the latter parts are not visible in use and this avoids any unsightly appearance, whereas the make up of the exposed plate portion 23 can be selected for optimum pleasing appearance.

Since it would normally otherwise be detrimental to provide throughbores in eyeglass frames extending from the nose pad area to the internal lens holding groove of each frame rim, because this would allow entry of foreign substances into these dead spaces around the contained lens, and would provide insufficient support for mounting any contemplated structural parts, as compared to providing throughbores in other locations on eyeglass frames remote from the lens holding grooves for such purposes, it is unexpected that such throughbores may be favorably provided in the manner of the present invention.

This is because the bases 26 adequately plug the throughbores while the plate portion 23 similarly covers and protects such the element 22 is sufficiently supported thereat due to its relatively light weight and small size and the fact that an forces acting through the element 22 on the throughbores and in turn on the given frame rim are confined for the most part to forces acting perpendicularly on the nose pad area and thus which are distributed throughtout the entirety of the coextensive common contact area between the inner side 25 and the surface of the rim along the nose pad area thereof, due to the nature of the positioning of the eyeglass frame 2 on the wearer.

It is also unexpected that the mounting portion of the element 22 provides the stated advantages by fashioning the same as a bipartite mounting system including a base 26 for engaging supportingly the throughbore of the frame rim and an elongated and smaller cross sectional thickness retainer 27, not only sized in thickness to permit it to be readily received and compressibly deformed in the lens groove by the lens itself for locking the element 22 on the frame rim, but also sized in length to permit it to be threaded through the throughbore and then be grasped to pull under stretching force sufficiently to reduce the girth of the base 26 for facilitated passage into the throughbore.

It will be appreciated that the foregoing specification and drawings are set forth by way of illustration and not limitation and that various modifications and changes may be made therein without departing from the spirit and scope of the present invention, which is to be limited solely by the scope of the appended claims.

What is claimed is:

1. Eyeglass frame and nose pad assembly comprising a resiliently deformable unitary pad element including
    a plate portion having an outer side for engaging the nose of the wearer and an inner side adapted for engaging the corresponding nose pad area of an eyeglass frame rim,
    intermediate base means integral with and extending outwardly from the inner side of the plate portion in a direction away from the outer side of the plate portion and sized and shaped for insertion into corresponding throughbore means in the nose pad area of the eyeglasses frame rim which throughbore means open into the corresponding lens retaining internal groove of the eyeglass frame rim, and end extension linear retaining means connected directly to and extending outwardly from the intermediate base means and defining a shoulder transition at the corresponding point of connection therebetween, the retaining means being sized and shaped for insertion through the throughbore means for location in and disposition linearly along the internal groove of the eyeglass frame rim and adapted for deformable engagement in the groove with the adjacent periphery of the corresponding eyeglass lens upon insertion of such lens into such groove for thereby lockingly mounting the element on the corresponding frame rim without visibility of same.

2. Pad of claim 1 wherein the element is composed of pliable and flexible, stretchable and compressible, soft cushioning material.

3. Pad of claim 1 wherein the base means has a predetermined cross-sectional thickness and the retaining means has a smaller cross-sectional thickness than that of the base means, and the shoulder transition defines an inward crosswise step from the base means to the retaining means.

4. Pad of claim 3 wherein an outwardly directed stop means is disposed at the shoulder transition, the stop means being sized and shaped to exceed slightly thereat the corresponding internal diameter of the throughbore means in the eyeglass frame rim sufficiently to engage the adjacent margin of the end of the throughbore means located within the internal groove of the frame rim for acting as a self locking stop thereat for enhanced prevention of separation of the element from the frame rim.

5. Pad of claim 1 wherein the base means includes a pair of spaced apart intermediate bases correspondingly connected to and extending outwardly from the inner side of the plate portion and each such base being sized and shaped for insertion into a corresponding throughbore in the eyeglass frame rim, and the retaining means includes a pair of spaced apart end extension linear retainers correspondingly connected to and extending outwardly from the pair of bases and defining a pair of shoulder transitions at the corresponding points of connection therebetween, the retainers each being sized and shaped for location in and disposition linearly along the internal groove of the frame rim and adapted for corresponding deformable engagement therein with the adjacent periphery of the eyeglass lens upon insertion of such lens into such groove.

6. Pad of claim 5 wherein each base has a predetermined cross-sectional thickness and each retainer has a smaller cross-sectional thickness than that of the corresponding base, and each shoulder transition defines an inward crosswise step from the corresponding base to the corresponding retainer.

7. Pad of claim 6 wherein an outwardly directed stop is disposed at each shoulder transition, each stop being sized and shaped to exceed slightly thereat the internal diameter of the corresponding throughbore in the eyeglass frame rim sufficiently to engage the adjacent margin of the end of such throughbore located within the internal groove of the frame rim for acting as a self locking stop thereat for enhanced prevention of separation of the element from the frame rim.

8. Eyeglass frame and nose pad assembly comprising a pair of opposed eyeglass lens frame rims and a nose bridge disposed therebetween, each rim having an external nose pad area adjacent the nose bridge for accommodating a nose pad, an internal groove operatively retaining an eyeglass lens inserted therein, and throughbore means defined in the rim and extending from the nose pad area to the groove, and a corresponding resiliently deformable unitary pad element mounted on each rim, each pad element including a plate portion having an outer side for engaging the nose of the wearer and an inner side engaging the nose pad area of the rim, intermediate base means integral with and extending outwardly from the inner side of the plate portion in a direction away from the outer side of the plate portion and positioned within the throughbore means in the rim, and end extension linear retaining means connected to and extending outwardly from each intermediate base means in such direction and defining a shoulder transition at the corresponding point of connection therebetween, the retaining means being located in and disposed linearly along the groove of the rim and deformably engaged in the groove with the adjacent periphery of the eyeglass lens inserted in the groove so as to lockingly mount the element on the corresponding rim without visibility of same.

9. Pad of claim 8 wherein the element is composed of pliable and flexible, stretchable and compressible, soft cushioning material.

10. Pad of claim 8 wherein the base means has a predetermined cross-sectional thickness and the retaining means has a smaller cross-sectional thickness than that of the base means, and the shoulder transition defines an inward crosswise step from the base means to the retaining means.

11. Pad of claim 10 wherein an outwardly directed stop means is disposed at the shoulder transition, the stop means being sized and shaped to exceed slightly thereat the corresponding internal diameter of the throughbore means in the rim sufficiently to engage the adjacent margin of the end of the throughbore means located within the internal groove of the rim for acting as a self locking stop thereat for enhanced prevention of separation of the element from the corresponding rim.

12. Pad of claim 8 wherein with respect to each rim and its corresponding element, the base means includes a pair of spaced apart intermediate bases correspondingly connected to and extending outwardly from the inner side of the plate portion, the throughbore means includes a pair of spaced apart throughbores in the rim correspondingly containing the pair of bases inserted thereinto, and the retaining means include a pair of spaced apart end extension linear retainers correspondingly connected to and extending outwardly from the pair of bases and defining a pair of shoulder transitions at the corresponding points of connection therebetween, the retainers each being located in and disposed linearly along the internal groove of the rim and deformably engaged in the groove with the adjacent periphery of the lens inserted in the groove.

13. Pad of claim 12 wherein each base has a predetermined cross-sectional thickness generally corresponding to the internal diameter of the corresponding throughbore and each retainer has a smaller cross-sectional thickness than that of the corresponding base, and each shoulder transition defines an inward crosswise step from the corresponding base to the corresponding retainer.

14. Pad of claim 13 wherein an outwardly directed stop is disposed at each shoulder transition in engagement with adjacent margin of the end of the corresponding throughbore located within the internal groove of the rim for acting as a self locking stop thereat for enhanced prevention of separation of the element from the rim.

15. Pad of claim 8 wherein the frame rims are composed of plastic.

16. Pad of claim 8 wherein the frame rims are composed of metal.

17. Eyeglass frame comprising a pair of opposed eyeglass lens frame rims and a nose bridge disposed therebetween, each rim having an external nose pad area adjacent the nose bridge for accommodating a nose pad, an internal groove for operatively retaining an eyeglass lens therein, and at least two throughbores defined in the rim and extending from the nose pad area to the groove, each throughbore being sized and shaped to receive insertingly there at a resiliently deformable mounting portion of a nose pad element, a resiliently deformable unitary nose pad element having a mounting portion which includes at least two end portions integral therewith and adapted to be disposed in the groove of each rim in deformable engagement therein with the adjacent periphery of the corresponding eyeglass lens upon insertion of such lens into such groove for thereby mounting the element on the corresponding rim without visibility thereof.

18. Frame of claim 17 wherein the throughbore means includes a pair of spaced apart throughbores extending form the nose pad area to the groove.

* * * * *